Figure 1:
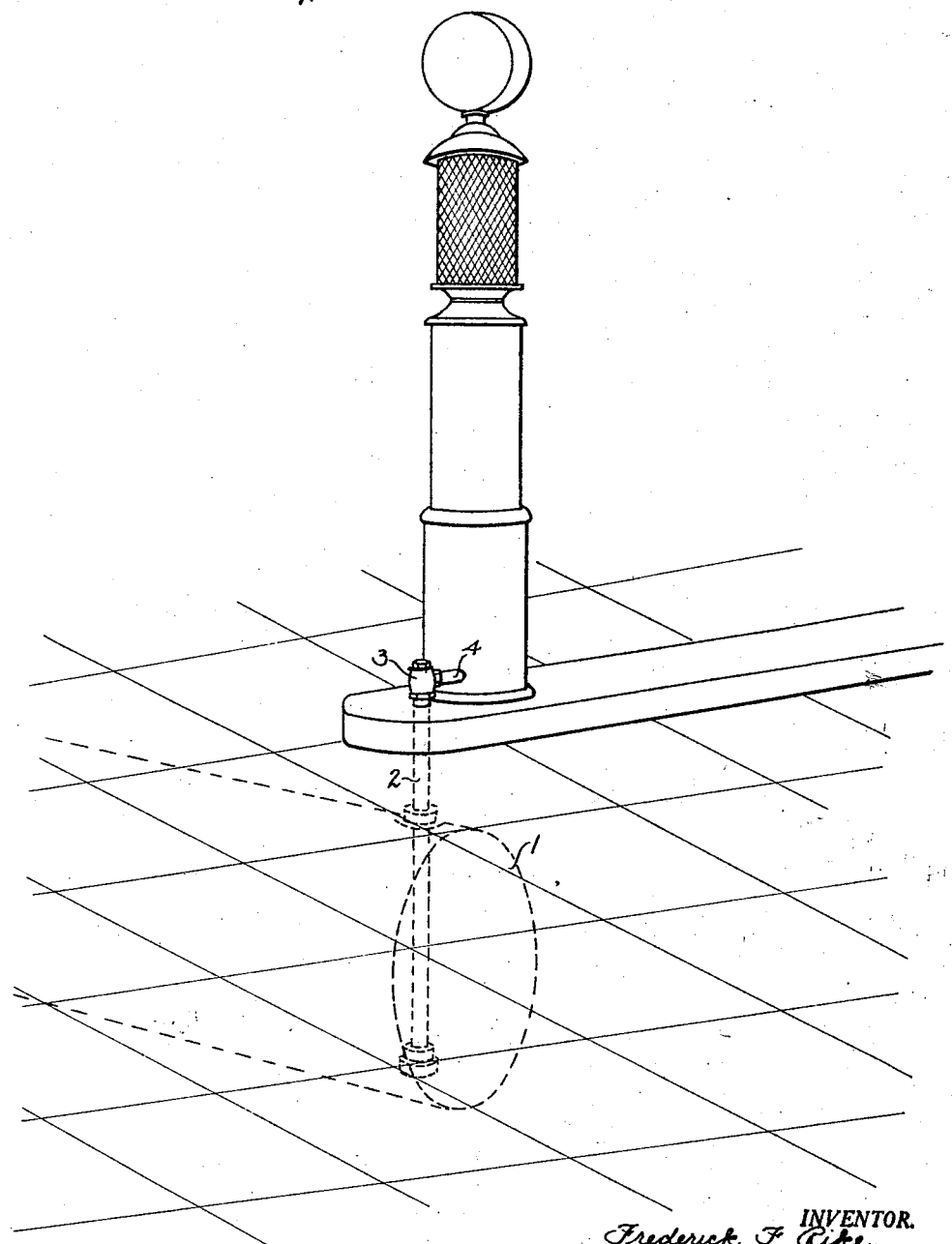

June 2, 1931.    F. F. RIKE ET AL    1,808,074
VALVE
Filed Oct. 24, 1927    2 Sheets-Sheet 1

INVENTOR.
Frederick F. Rike.
William P. Huffman.
BY Toulmin & Toulmin,
ATTORNEYS.

June 2, 1931. F. F. RIKE ET AL 1,808,074
VALVE
Filed Oct. 24, 1927 2 Sheets-Sheet 2
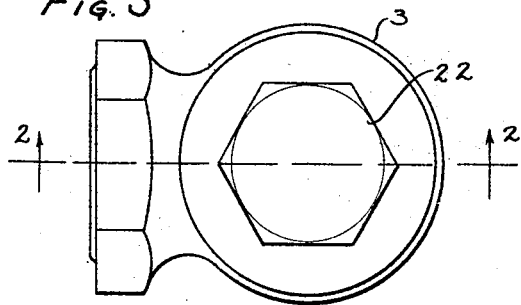
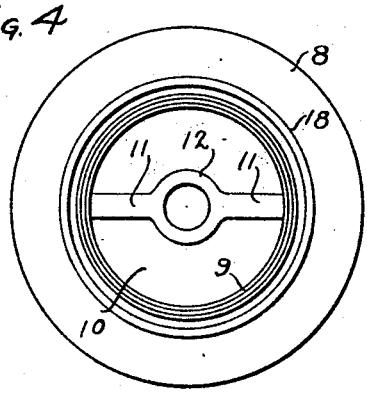
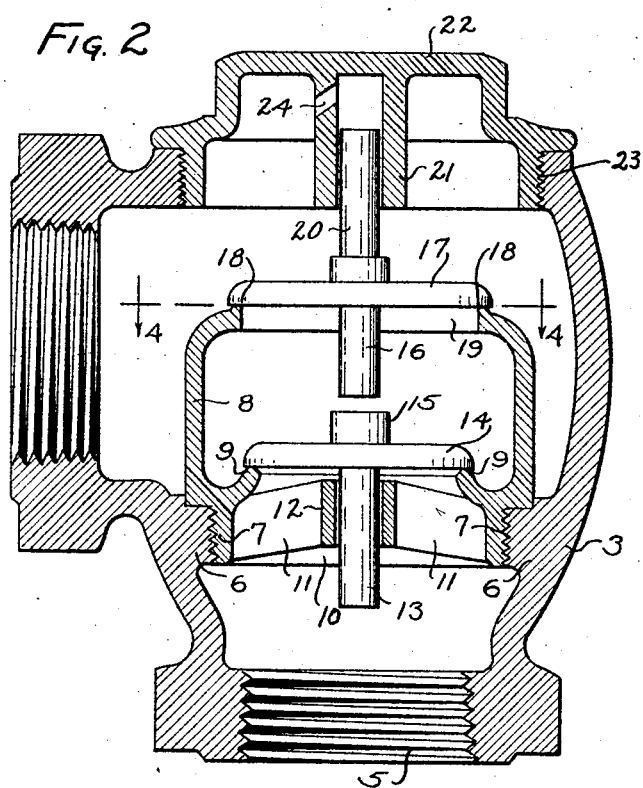
INVENTOR.
Frederick F. Rike
William P. Huffman
BY Toulmin & Toulmin
ATTORNEYS.

Patented June 2, 1931

1,808,074

UNITED STATES PATENT OFFICE

FREDERICK F. RIKE AND WILLIAM P. HUFFMAN, OF DAYTON, OHIO, ASSIGNORS TO BUCKEYE IRON AND BRASS WORKS, OF DAYTON, OHIO, A CORPORATION OF OHIO

VALVE

Application filed October 24, 1927. Serial No. 228,265.

Our invention relates to double poppet angle check valves.

It is the object of our invention to provide a self-sealing double poppet angle check valve adaptable to be mounted in a fluid supply system, particularly one handling volatile liquids and so located in the system that it will be above ground where it is easily accessible, thereby eliminating the present problem of getting access to various types of foot valves which are difficult to adjust or repair or replace because they are buried in the ground.

Referring to the drawings:

Figure 1 is a diagrammatic layout of a fluid supply system embodying the valve showing its general location;

Figure 2 is a vertical section through the valve showing the poppets in full lines;

Figure 3 is a top plan view of the poppet valve;

Figure 4 is a section on the line 4—4 of Figure 2 with the poppet valves removed.

Referring to the drawings in detail, 1 is a tank connected by the pipe 2 to the valve casing 3 to which is connected an outlet pipe 4. The inlet side of the casing 3 is threaded at 5 to receive the pipe 2. Spaced above this threaded portion 5 is an inwardly-extending shoulder 6 threaded at 7 to receive and support a valve cage 8 which is provided with an inwardly extending, upwardly projecting sharp edged valve seat 9 adjacent the passageway 10 in which is also located a spider 11 having an apertured sleeve 12 in the center thereof for guiding the poppet valve stem 13. The valve proper 14 rests upon the edged valve seat 9. A center stud 15 on the upper side of the valve is adapted to engage with the lower end of the valve stem 16 of the second poppet valve 17.

An extension of the cage 8 upwardly into a sharp edged rim 18 around the aperture 19 forms the support for the upper poppet valve 17. The poppet valve 17 has an upwardly extending stem 20 loosely fitting within the guide sleeve 21 of a detachable cap 22. This cap is threaded into the casing at 23 by an aperture which is sufficiently large to permit of the insertion of the valve cage 8 and the poppet valves. The aperture 19 of the valve cage 8 is large enough to permit of the insertion of the smaller poppet valve 14. A relief port 24 is provided in the sleeve 21 to allow the air compressed by the stem 20 in the sleeve 21 to escape.

As this poppet valve is located above ground, it is easily accessible, and by so arranging the parts that they may be placed in position through a common aperture which is closed by the cap 22 it is possible to adjust, replace and repair the several elements of the combination without digging up the ground or disturbing the rest of the mechanism to which the valve is attached.

It will be understood that we desire to comprehend within our invention such modifications as may be necessary to adapt it to varying conditions and uses.

Having thus fully described our invention, what we claim as new and desire to secure by Letters Patent, is:

1. In combination, a valve casing having inlet and exit pipes arranged and connected thereto at right angles to one another, a detachable cover in line with one of said pipes, a valve cage detachably mounted in line therewith and poppet valves carried by said cage, and means to guide said valves, said valves being so arranged that the movement of one will move the other while they may move a predetermined distance independently one of the other.

2. In combination, a valve casing having inlet and exit ports, a valve cage threaded therein on a shoulder thereof, said cage having spaced valve seats projected inwardly of said cage, a spider adjacent one of said seats for guiding a valve, a valve having a depending guiding stem and upwardly projecting valve lift stem, a second superimposed poppet valve having a depending valve engaging stem and an upwardly extending valve guiding stem, and means to guide said last mentioned stem.

3. In combination, a valve casing having inlet and exit ports, a valve cage threaded therein on a shoulder thereof, said cage having spaced valve seats projected inwardly, a spider on said cage adjacent one of said seats for guiding a valve, a valve having a depending guiding stem and upwardly projecting valve lift stem, a second superimposed poppet valve having a depending valve engaging stem and an upwardly extending valve guiding stem, and means to guide said last mentioned stem, said guiding means being formed in a detachable closure member mounted in said casing.

4. In combination, a valve casing having inlet and exit ports, a valve cage threaded therein on a shoulder thereof, said cage having spaced valve seats projected inwardly, a spider on said cage adjacent one of said seats for guiding a valve, a valve having a depending guiding stem and upwardly projecting valve lift stem, a second superimposed poppet valve having a depending valve engaging stem and an upwardly extending valve guiding stem, and means to guide said last mentioned stem, said guiding means being formed in a detachable closure member mounted in said casing of sufficient size for the removal therethrough of said cage and said valves.

5. In a valve structure, a casing having an inlet and an outlet and an opening, a closure for said opening, a sleeve on said closure projecting into the casing, a valve cage adapted to be inserted through said opening and removably supported by said casing, and a valve member for said cage having a stem projecting into said sleeve and guided thereby, said sleeve having a relief opening for the passage of fluid to and from the sleeve behind the stem.

6. In a valve structure, a valve casing having an opening therein, a closure for said opening, an inwardly projecting sleeve on said closure with a passageway therein, and a valve member in said casing having a stem projecting into and guided by the sleeve, said passageway serving as a relief opening for the flow of fluid to and from the sleeve behind the stem.

In testimony whereof, we affix our signatures.

FREDERICK F. RIKE.
WILLIAM P. HUFFMAN.